Jan. 10, 1967 D. S. CHISHOLM 3,296,755
STRUCTURAL PANELS AND STRUCTURES THEREFROM
Filed May 28, 1962 3 Sheets-Sheet 1

INVENTOR.
Douglas S. Chisholm
BY
AGENT

INVENTOR.
Douglas S. Chisholm
AGENT

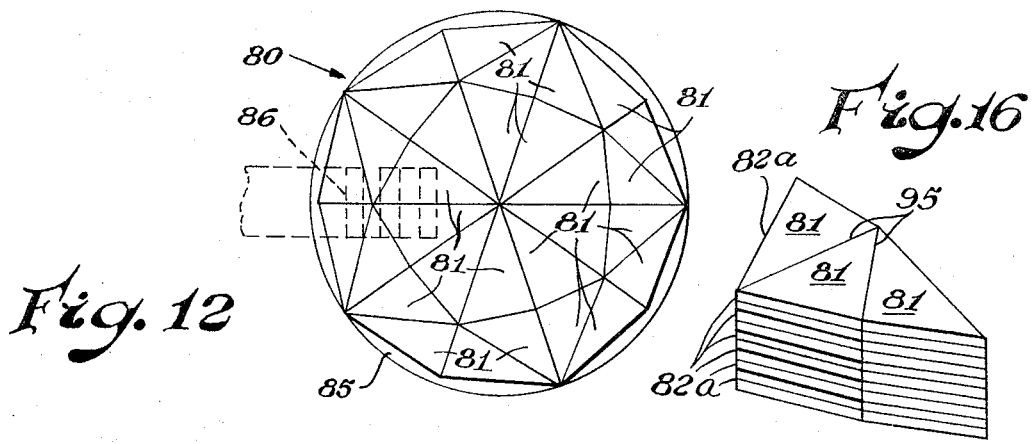
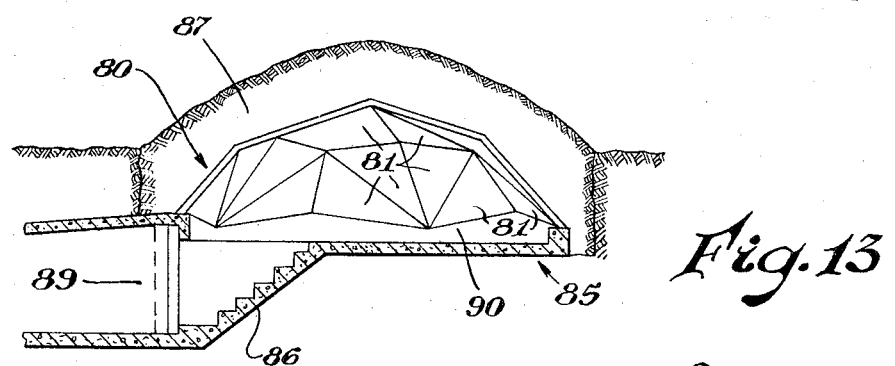
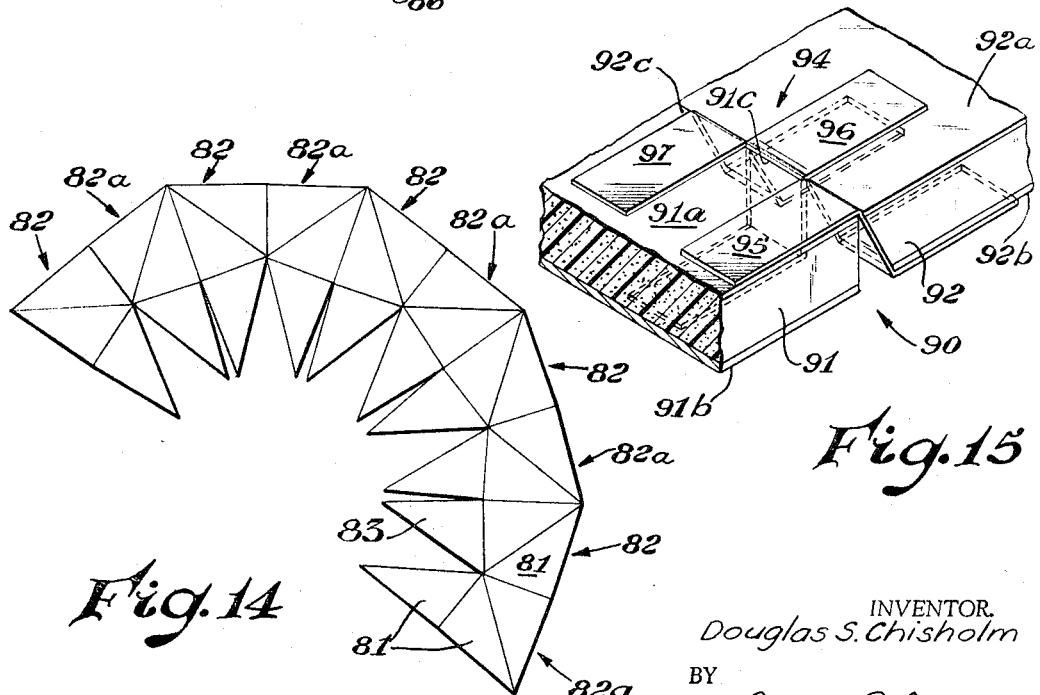

United States Patent Office 3,296,755
Patented Jan. 10, 1967

3,296,755
STRUCTURAL PANELS AND STRUCTURES THEREFROM
Douglas S. Chisholm, Midland, Mich., assignor to The Dow Chemical Company, Midland, Mich., a corporation of Delaware
Filed May 28, 1962, Ser. No. 198,123
12 Claims. (Cl. 52—81)

This invention relates to generally spherical structures and structural panels. It more particularly relates to tessellated structures having generally spherical surfaces and panels for their construction.

The term "spherical," as used herein, means having the form of a sphere; includes bodies having the form of a portion of a sphere; also includes polygonal bodies whose sides are so numerous that they appear to be generally spherical.

A number of methods are employed for the preparation or construction of generally spherical enclosures. One of the better known of these is disclosed in United States Letters Patent 2,682,235 to R. B. Fuller. Other tessellated generally spherical surfaces have been developed, but suffer from a common difficulty that no single simple geometric form is readily employed constructing a spherical surface. Thus, many and different sized struts, panels and like parts are utilized to complete the basic structure. Some small units are known which use a generally regular geometric form, but suffer from the disadvantage of having what can be called negative curvature, that is, curvature of a generally spherical surface which results in one or more concave portions appearing on a generally convex spherical surface. A well-known example of negative curvature are the depressions on the surface of a golf ball. Such negative curvature is undesirable as it substantially departs from the spherical form and tends to reduce the structural strength. It is also disadvantageous in that the volume of such a sphere having negative curvature is generally less per unit area than that of a sphere having only positive curvature.

It is an object of this invention to provide a spherical structure comprised of a plurality of generally flat sheet members having a generally triangular configuration.

It is a further object of this invention to provide a generally triangular flat sheet member which is employed to fabricate a generally spherical structure.

It is another object of this invention to provide a generally spherical structure which is fabricated from a plurality of identical triangular sheet members.

It is an object of this invention to provide a generally spherical structure of only positive curvature fabricated from a plurality of generally triangular sheets having mirror image symmetry.

It is also an object of this invention to provide a method for the assembly of such generally spherical structures.

These benefits and other advantages in accordance with the invention are readily achieved by providing a structural member of a generally flat configuration having a generally triangular form, said triangular form having three angles, A, B and C, and having sides opposite said angles, $a$, $b$ and $c$, respectively, said angles A, B and C being about 34½°, 58°, and 87°, respectively, and said sides $a$, $b$ and $c$ having relative lengths of about 4, 6 and 7 units, respectively.

Also contemplated within the scope of the invention is an assembly of a plurality of structural panels having a generally flat sheet-like surface of generally triangular form as hereinbefore described, wherein said spherical surfaces are comprised of generally pentagonal elements, said pentagonal elements comprising ten panels and having their similar sides B and C being substantially congruent and the apexes directed toward a common point, said spherical surface being generally comprised of at least one of said assemblies and each of the triangular panels of said assembly having their sides $c$ generally congruent with the side $c$ of a similar triangular panel to form a desired spherical surface. The panels are affixed in such a manner that like angles of adjacent triangles are immediately adjacent each other.

Also within the scope of the invention is a method of fabricating a hemispherical structure from an assembly of triangular panels of the invention wherein about 60 of said triangular panels are assembled into basic groups of twelve panels, said panels being arranged in basic groups of twelve with like angles adjacent in such a manner that a generally elongate assembly is prepared, each of said assemblies having a first terminal panel having its side $a$ in hinged relationship to side $a$ of a second triangular panel, said second triangular panel being in hinged relationship to a third triangular panel by means of their sides $c$ of the second and third panels, a fourth panel hingedly connected to said third panel by means of their sides $b$, a fifth triangular panel hingedly affixed to said fourth triangular panel by means of their sides $c$, a sixth triangular panel hingedly affixed to said fifth panel by means of their sides $b$, a seventh panel affixed to said sixth panel by means of their sides $a$, an eighth panel hingedly affixed to said seventh panel by means of their sides $b$, a ninth panel hingedly affixed to the seventh triangular panel by means of their sides $c$, a tenth triangular panel hingedly affixed to said ninth triangular panel by means of their sides $b$, an eleventh triangular panel affixed to said tenth triangular panel by means of their sides $c$, a twelfth triangular panel affixed to said eleventh triangular panel by means of their sides $a$, five of said twelve panel assemblies arranged in generally side by side relationship wherein the first, third and fifth of such assemblies are in like arrangement with the first panels of said first, third and fifth assemblies being at the same end of the arrangement and the second and fourth assemblies having their first panel at the opposite end of the arrangement, the first assembly being hinged affixed to the second assembly by means of side $c$ of the sixth panel of the first assembly and the second assembly joined to the first assembly by means of side $c$ of the eighth panel of the second assembly, said second assembly hingedly joined to said third assembly by means of side $c$ of the sixth panel of the second assembly and by means of side $c$ of the eighth panel of the third assembly, said third assembly being joined to said fourth assembly by means of side $c$ of the sixth panel of said third assembly and side $c$ of the eighth panel of the fourth assembly, the fourth assembly being joined to the fifth assembly by means of side $c$ of the sixth panel of the fourth assembly and side $c$ of the eighth panel of the fifth assembly. Subsequently, the arrangement of triangular panel assemblies is formed into a hemispheric configuration by providing tension means between the twelfth, first, twelfth, first and twelfth panels of the first, second, third, fourth and fifth assemblies, respectively, and providing tension means between the first, twelfth, first, twelfth, and first panels of the first, second, third, fourth and fifth assemblies and drawing said terminal panels on adjacent ends together to form a generally hemispherical surface.

The relative dimensions of such a triangle are A, 34°36'; B, 58°7', and C, 87°17', and $a$ 4.00; $b$, 6.03, and $c$, 7.06 if a precise fit is desired. Certain minor deviations from the theoretical dimensions are often permissible and the magnitude of such deviations will depend on the material of construction employed and the end use to which this spherical surface is intended.

Further features and advantages of the invention will become more apparent from the following description and specification when taken in conjunction with the drawings wherein.

Figure 8:
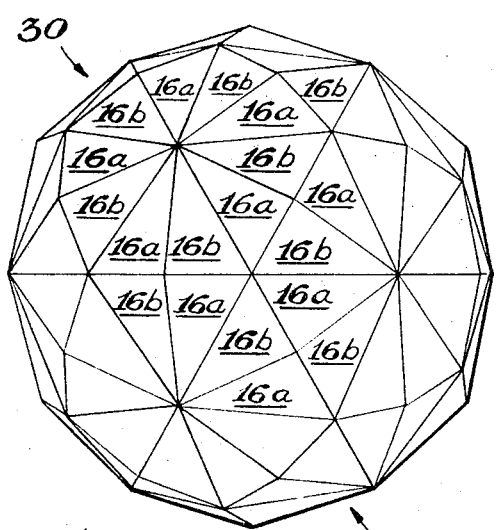
Figure 9:
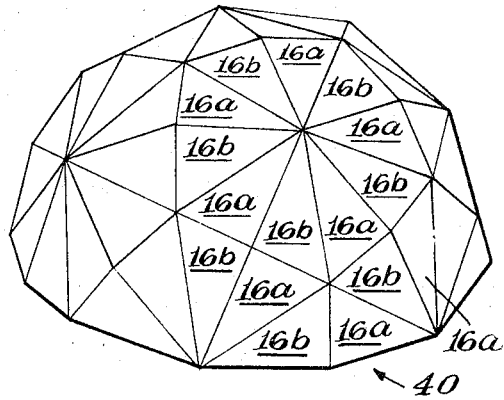
Figure 10:
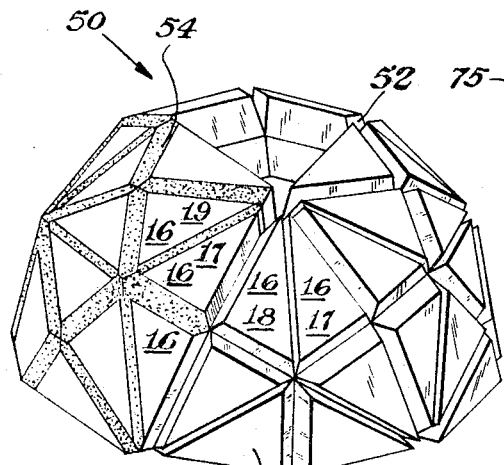
Figure 11:
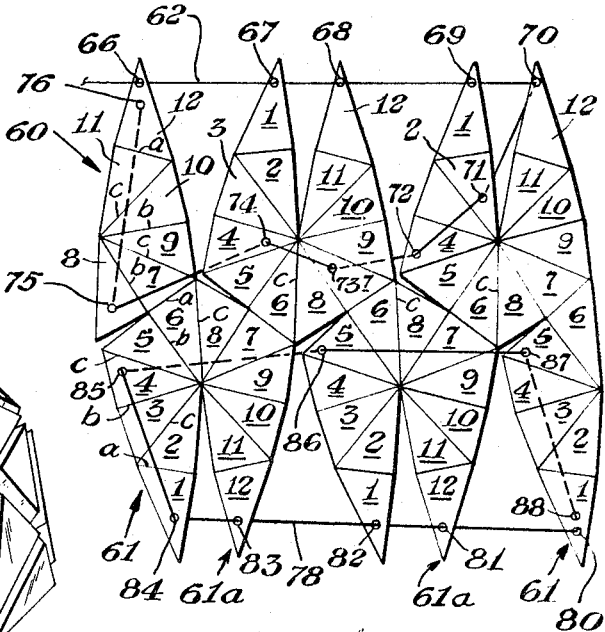

FIGURE 8 schematically illustrates a sphere constructed in accordance with the invention;

FIGURE 9 schematically illustrates an isometric view of a hemisphere constructed in accordance with the invention;

FIGURE 10 depicts a hemisphere constructed employing panels of an alternate embodiment of the invention;

FIGURE 11 shows schematically a flat development of a hemisphere in accordance with the invention;

FIGURE 12 depicts a "quarter dome" fabricated from triangular panels in accordance with the invention;

FIGURE 13 depicts a "quarter dome" utilized in a structure;

FIGURE 14 schematically depicts a flat development of a "quarter dome"; (the term "quarter dome" as utilized herein is employed to describe a portion of a generally spherical surface constructed from about 30 triangular panels);

FIGURE 15 depicts a schematic fragmentary isometric view of a portion of a pair of panels in accordance with the invention joined by a hinge;

FIGURE 16 depicts a schematic isometric view of the assembly of FIGURE 14 when folded to provide a shipping package.

Figure 1:
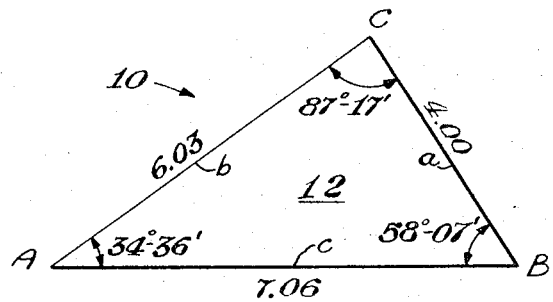
FIGURE 1 depicts the basic theoretical triangle in accordance with the invention.

FIGURE 1 depicts a plan view of a basic triangular panel in accordance with the invention, the basic triangular panel generally indicated by the reference numeral 10. The triangular panel 10 has a major face 12 and a second major face (not shown). The panel 10 has three sides, $a$, $b$, and $c$, and three angles, A, B and C, disposed opposite the correspondingly designated sides.

In FIGURES 2, 3, 4 and 5, there is illustrated an alternate panel in accordance with the invention generally designated by the reference numeral 16, having three sides $a'$, $b'$ and $c'$, which are disposed opposite corresponding angles A', B' and C'. The panel 16 has a major face 17 and an opposite major face 18. The side $a'$ has a face portion generally designated by the reference numeral 19. The face portion 19 comprises two surfaces designated as 19a and 19b disposed in generally parallel mirror image relationship and defining an obtuse external angle between them. The side $b$ has a face portion generally indicated by the reference numeral 22 which comprises two portions 22a and 22b defining an external obtuse angle. The side $c$ has an edge portion generally designated by the reference numeral 24, the edge face of side 24 being comprised of two generally planar faces 24a and 24b and defining an obtuse angle therebetween. The edge faces 19, 22 and 24 have a center line between each of the two halves 19a, 19b, 22a, 22b and 24a and 24b, which lies in a plane of symmetry. The panel 16 shows a mirror image symmetry about this plane.

In order to provide close fitting engagement of the panels 16, the edges thereof are beveled. Each of the edges 19, 22 and 24 is provided with a chamfer from both faces 17 and 18 in such a manner that a circumferential ridge having generally planar faces results. For optimum fit, the faces 19a diverge from the vertical toward the body of the panel to an angle of about 15° 30'. On side $b$ the angle of chamfer from the vertical is 10°10' and on side $c$ the angle is about 55'. These dimensions are the optimum in dimensions for a fit of a panel having a completely rigid edge.

Figure 6:
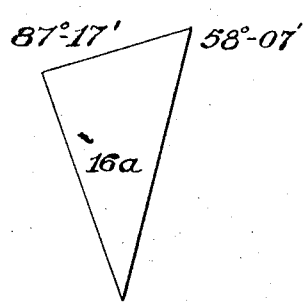
FIGURES 6 and 7 depict an alternate form of a pair of panels in accordance with the invention.
Figure 7:
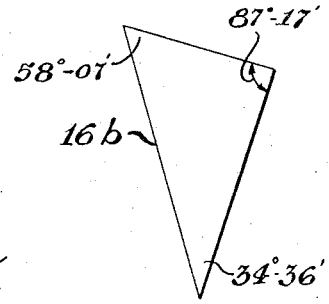
Figure 2:
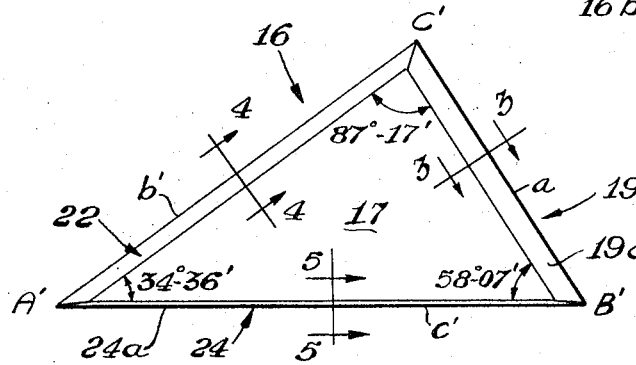
FIGURES 2, 3, 4 and 5 depict the plan view and enlarged edge views.
Figure 3:
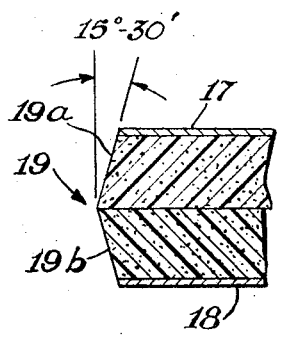
Figure 4:
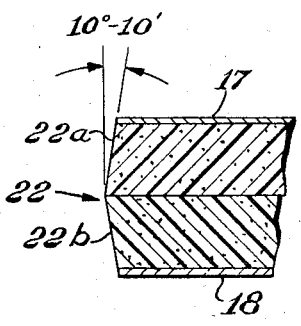
Figure 5:
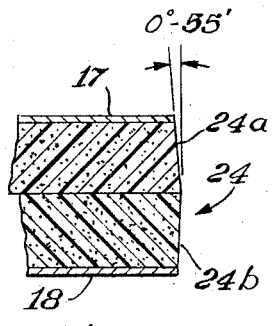

In FIGURES 6 and 7 are shown two panels 16A and 16B which are similar to the embodiment illustrated in FIGURES 2, 3, 4 and 5, which are effectively developed by dividing the panel 16 about the plane of mirror image symmetry.

In FIGURES 8, there is schematically illustrated a spherical structure generally designated by the reference numeral 30 comprising a plurality of panels 16a and 16b of FIGURES 6 and 7. The spherical structure is assembled by joining 60 identical panels having the configuration of panel 16a and 60 identical panels having the configuration of panel 16b. The panels initially may be assembled by joining 10 panels (5 each of 16a and 16b) in such a manner that the sides equivalent to $b$ and $c$ of triangle 10 of adjacent panels are together. This necessitates providing five panels 16a of FIGURE 6 and arranging them with their apexes A arranged together and lying in one plane. Five panels 16b are provided and placed between the first five panels 12. Adjacent sides of the traingles are then joined together forming a generally pentagonal configuration composed of 10 triangles. The resultant configuration also generally resembles a decahedral pyramid. By assembling a total of 12 of these generally pentagonal forms in edge to edge relationship and having curvature in the same sense the generally spherical structure of FIGURE 8 results.

In FIGURE 9, there is schematically illustrated a hemisphere 40 formed in generally the same manner as the sphere of FIGURE 8. However, four full pentagonal assemblies are required and four half pentagonal assemblies, that is, assembies of five triangular panels in the manner of the assembly of FIGURE 6.

In FIGURE 10, there is a schematic representation of a hemisphere 50 fabricated from a plurality of panels as shown in FIGURES 2, 3, 4 and 5 assembled in substantially the same manner as the hemisphere in FIGURE 9. The panels 16 are in adjacent relationship and exposed to the exterior surface of the sphere 50 alternately faces 17 and 18. Between the surfaces 17 and 18 there is formed a generally V-shaped groove 52 defined by the edge surfaces 19a and 19b, 22a, 22b, and 24b of adjacent panels. Beneficially, if desired, fillet strips or caulking 54 are readily employed to fill the grooves between adjacent panels.

FIGURE 11 schematically depicts arrangement 60 of panels 12 which is a flat development of a hemisphere such as 40 and 50. The arrangement 60 comprises five subassemblies of panels 12 designated by the reference numerals 61 and 61a. The subassemblies 61 and 61a comprise twelve panels 12. Each of the panels 12 are joined by means of a suitable hinge (omitted in the drawing for sake of clarity) which is positioned on adjacent sides. The assembly 61 comprises a first panel, designated in the drawing by 1, which is hinged to a second panel 2 by means of their sides, $a$, the second 2 panel in turn is hinged to the third panel 3 by means of their sides $c$. The third panel 3 is hinged to the fourth panel 4 by means of their side $b$. The fourth and fifth panels 4 and 5 are hinged by their sides $c$. The fifth and sixth panels 5 and 6 are hinged at their sides $b$. The sixth and seventh panels 6 and 7 are hinged at their sides $a$. The seventh and eighth panels 7 and 8 are hinged at their sides $b$. The seventh and ninth panels 7 and 9 are hinged at their sides $c$. The ninth and tenth panels 9 and 10 are hinged at their sides $b$. The tenth and eleventh panels 10 and 11 are hinged at their sides $c$ and the eleventh and twelfth panels 11 and 12 at their sides $a$. Five such assemblies are provided in generally parallel arrangement wherein the first, third and fifth assemblies have their first panel disposed toward one end of the arrangement and the second and fourth panels have their twelfth panels disposed generally adjacent the first panels of the first, third and fifth assemblies. The first and second assemblies are joined by means of side $c$ of the sixth panel of the first assembly and side $c$ of the eighth panel of the second assembly. The second and third assemblies are joined by side $c$ of the sixth panel of the second assembly and side $c$ of the eighth panel of the third assembly. The third and fourth assemblies are joined by means of side $c$ of the sixth panel of the third assembly and side $c$ of the eighth panel of the fourth assembly. The fourth assembly and fifth assembly are joined by means of side $c$ of the sixth panel of the fourth assembly and side $c$ of the eighth panel of the fifth assembly. A tension means such as a cable 62 passes through a plurality of means 66, 67, 68, 69, 70, 71, 72, 73, 74 and 75 to slidably retain said cable. These means are attached to the twelfth panel of the first assembly, the first panel of the second assembly, the twelfth panel of the third assembly, and the first panel of the fourth assembly, the twelfth panel of the fifth assembly, the second panel of the fourth assembly, the fourth panel of the fourth assembly, the fourth panel of the second assembly, and the seventh panel of the first assembly. The cable 62 terminates at a tie point 76 located on the twelfth panel of the first assembly. A second cable or tension means 78 is provided which passes through a plurality of sliding retaining means 80, 81, 82, 83, 84, 85, 86 and 87 located on the first panel of the fifth assembly, the twelfth panel of the fifth assembly, the first panel of the third assembly, the twelfth panel of the second assembly, the first panel of the first assembly, the fourth panel of the first assembly, the fifth panel of the third assembly, and the fifth panel of the fifth assembly, respectively. The cable 78 terminates at and is secured to the tie point 88. When tension is applied to the free ends of the lines or cables 62 and 78 the terminal panels of the assemblies are drawn together into two groups of five and a hemispherical dome results. Obviously, the two groups of panels must be drawn together on the same side or face of the arrangement in order to obtain a hemispherical dome. Advantageously, in certain cases, particularly wherein the resultant dome will be large or heavy, it is usually beneficial to raise the center portion of the flat development of the dome to a greater or lesser degree in order to minimize the initial amount of force required to initiate the erection of the dome or hemisphere.

In FIGURE 12, there is schematically illustrated a top view of a quarter dome generally designated by the reference numeral 80. The dome 80 comprises a plurality of triangular panels 81 having a configuration generally similar to that depicted in FIGURE 1. The quarter dome 80 comprises an assembly of ten panels 81 having their apexes placed together and arranged in alternate right and left hand configuration into a generally pentagonal figure. At the periphery of this figure there are arranged alternate pairs of triangular panels 81 having like sides abutting the like sides of the triangular panels 81 added about the periphery. This results in a generally star-like configuration to which are added a pair of triangular panels 81, between each of the five arms of the star-like configuration. The added panels 81 have like sides abutting like sides of the triangles in the star-like configuration and in turn their shorter sides abutting. The quarter dome 80 rests upon the generally circular foundation 85 having steps or stairs 86.

FIGURE 13 depicts a side sectional view of the quarter dome 80 composed of the panels 81 resting upon the foundation 85 which is shown in section. The quarter dome 80 and foundation are buried beneath earth or fill 87 and an access means 89 is provided to provide an entrance to the space 90 within the quarter dome 80.

In FIGURE 14, there is illustrated a configuration which beneficially is utilized for the preassembly of a quarter dome 80 wherein a plurality of triangular panels 81 are joined to each other on their touching sides by hinge means not shown. The configuration of the panels 81 depicted in FIGURE 14 permits 10 triangular assemblies 82 and 82a to be assembled from 30 panels having the general configuration shown in FIGURE 1. Two panels 81 are arranged with their sides $a$ in abutting hinged relationship and like angles adjacent. A third panel is added in mirror image relationship to one of the panels of the pair in such a manner that the sides $c$ are in abutting hinged relationship. Ten of such assemblies 82 and 82a of three panels 81 each are arranged in side by side relationship in such a manner that the apex of each of the larger triangles is generally directed toward a central point. The adjacent assemblies of three panels each are placed in such a manner that the adjacent large triangles are mirror images of the adjacent large triangles until a total of 10 of these assemblies 82, 82a are together. When a hinge which permits folding of the assemblies of triangles into a surface which is generally a portion of a spherical surface, the resultant configuration may be readily assembled into a quarter dome by joining the like edges of the centrally located triangular panels 81 on the terminal facing portions of the assembly of the 10 large triangles. The 10 apical triangles are then joined by their facing edges and a completed quarter dome results.

In FIGURE 15, there is illustrated a fragmentary view of an assembly of triangular panels generally designated by the reference numeral 90. The assembly 90 comprises a foam plastic panel 91 and an adjacent foam plastic panel 92. The panel 91 is provided with a top skin 91a and a lower skin designated as 91b, and an adjacent edge portion 91c. The panel 92 has a skin 92a, and an opposite skin designated as 92b. The panel 92 is provided with an edge portion 92c. A hinge assembly generally designated by the reference numeral 94 joins the two panels 91 and 92. The hinge assembly 94 comprises a plurality of flexible straps 95, 96 and 97. The strap 95 is affixed to the surfaces 91b and 92b, as is the strap 97. The strap 96 is affixed to the surfaces 92a and 91b. The hinge assembly 94 permits the panels 91 and 92 to be displaced through a total rotation of about 360°. Beneficially, such a 360° hinge permits folding of an assembly such as is illustrated in FIGURE 14 into a compact and convenient package for shipping and permits relative ease of assembly. To aid and assist in assembly of a full half or quarter dome in accordance with the invention, a hinge having a lesser range of rotation may be readily utilized. Preferably, where the most compact storage is desired, the 360° hinge is usually most desirable. Although the hinge is illustrated in combination with panels such as 16a and 16b, it is readily utilized with those having a double bevel such as panel 16, as well as panels without bevel.

In FIGURE 16, there is schematically represented an isometric view of the assembly of FIGURE 14 wherein the quarter dome has been folded to a compact form comprising ten layers of three panel assemblies which have been folded by means of a hinge means 95 to a compact package.

Beneficially, a wide variety of final structures are readily prepared in accordance with the invention including those of spherical and hemipherical form and a plurality of domes or sections may readily be combined into larger structures. Certain panels may be omitted as a complete hemispherical structure is not required, and the variety of forms is limited only by the requirements of those fabricating such structures. The basic panel which is depicted in FIGURE 1 comprises a simple triangular flat sheet having edge portions substantially at right angles to the faces. These panels are particularly advantageous in the fabrication of relatively small spherical surface wherein the panel is thin relative to the final diameter or radius of the curved surfaces. Typical instances wherein such relatively thin panels are employed include the fabrication of such items as metal tanks; for example, a generally spherical tank is readily fabricated by first preparing 120 triangular portions or panels and assembling them together in alternating right and left hand configuration. In such an instance, beneficially the vertically extending edge portions of adjacent panels define a groove which is readily filled by the deposited filler metal. In structures fabricated from thin sheets such as composition board, thin laminated wood and the like, the embodiment of FIGURE 1 is adequate as the joints are usually filled with a mastic or similar composition and are oftentimes overlaid with a fabric. Thus, with the mastic or a similar filler chamfering the edges of thin panels is usually unnecessary and markedly increases the ease by which the component parts are prepared. In a similar manner, many spherical surfaces are readily fabricated from thin-like triangular panels. In many instances where a thicker panel section is desirable and a single cutting, casting or other forming operation is desired for the panels, the embodiment of FIGURES 2, 3, 4 and 5 is particularly advantageous. This embodiment adapts itself well to the fabrication of spherical surfaces wherein the thickness of the panel is large relative to the radius of the resultant spherical surface. Typical of such structures are those used for storage or dwelling wherein it is oftentimes desirable that the wall provide insulation as well as physical strength. Thus, triangular panel of sandwich construction having an insulation layer positioned between two external skins is employed with great benefit. Thus, like triangular panels are readily fabricated into a self-supporting structure having an appreciable wall thickness and closely abutting fitting surfaces which may be secured by adhesives and the like means. An external groove results at the junction of adjacent panels which is readily filled by a mastic caulking or a suitably formed fillet strip. If desired, panels may be prepared which are mirror images of each other similar to those depicted in FIGURES 6 and 7, which comprise the embodiment of FIGURES 2, 3, 4 and 5 divided at its plane of symmetry. Thus, by employing right hand and left hand panels, spherical surfaces or structures are produced which have no groove and provide a firm butt joint between the adjacent panels. Usually, in most applications, it is desirable that such panels should fit as well as possible in order to provide thin glue lines, but in many cases, close dimensional tolerances are neither desired nor are beneficial. For example, relatively close adherence to the theoretical dimensions should be maintained where adhesives and the like are employed to join the panels into the final structure. Such close tolerances and tight fit can be undesirable where such techniques as fushion welding are employed where a groove or gap is utilized to receive the weld metal deposit. The optimum dimensional tolerances will vary with the application of the panel, its material of construction, its relative size, the particular method employed in joining the panels, and similar well-known engineering variables. Thus, tolerances are dependent on each individual design.

In the practice of the invention a wide variety of structural materials are readily utilized. Beneficially, depending upon the application for which the spherical structure is to be utilized, such diverse materials as metal, plastic, concrete, and the like may be readily employed. Beneficially, in certain instances, composite panels are used with great benefit. The present invention particularly lends itself to the use of composite panels such as are prepared by laminating rigid, weatherproof face sheets, such face sheets being of metal, wood, fiber, or similar material such as concrete, foam plastics and the like. By utilizing foam plastic structural panels, structures of relatively great size are fabricated having a relatively low weight and yet exhibit high rigidity and great strength. Spherical surfaces in accordance with the invention which are prepared from foam plastic material provided a high degree of thermal insulation as well as the benefits which arise from the high strength and light weight. For heavy structures requiring greater strength, such as illustrated in FIGURE 13, panels of concrete or reinforced concrete are advantageously employed. Typically, in the fabrication of a structure similar to FIGURE 13, panels may be pre-cast from concrete with or without reinforcing and have a configuration generally similar to that illustrated in FIGURES 2, 3, 4 and 5 where a single mold is employed for the panels and when cast may readily be swung into assembly position by means of a crane or like hoisting device, maintained in position by temporary supports until the assembly is complete, at which time it is under compression and is entirely self-supporting. Such a structure is shown in FIGURE 13 wherein it rests on a foundation located below grade and the excavation backfilled to cover the structure. Such assemblies are particularly useful as shelters, storage areas, and the like.

If desired, for particularly large domes or spherical structures wherein relatively light construction parts are to be utilized, the panels may be fabricated in place from stock or pre-cut framing members which embody only the edge portion of the panels such as are shown in FIGURES 2, 3, 4, 5, 6 and 7 by using bolted, nailed, riveted glued, or similar construction. The basic frames are positioned into a generally hemispherical configuration and face sheets, insulation, or other desired additaments are made on the construction site in order to transform each of the frames into a triangular sheet connected to its neighbors. Advantageously, for certain applications wherein a full hemispherical or quarter spherical dome is desired, certain portions of the assembly may be omitted, resulting in the formation of a passageway into the resultant structure. Inherently, the removal of one edge panel in a hemispherical dome of sufficient size or part of the edge panel is oftentimes sufficient; however, frequently it is desirable to remove several panels in order to attain an entrance having the desired magnitude.

Particularly advantageous for light shelters or enclosures is the embodiment shown in FIGURES 12, 13, 14 and 16 wherein a quarter dome consisting of about 30 or fewer panels may be substantially prefabricated into the configuration shown in FIGURE 14 at a central location. Beneficially, the configuration of FIGURE 14, when utilized in conjunction with a 360° hinge, such as is shown in FIGURE 15, may then be neatly folded into a stack such as is illustrated in FIGURE 16 where the assemblies of three panels are in substantially parallel arrangement, one on top of the other. This assembly can then be strapped, banded, or packaged in a manner appropriate to the material of construction utilized and readily shipped or transported while occupying a minimum volume. On reaching the construction site, the package is readily opened, laid out into the configuration of FIGURE 14, and the enclosure is then placed in its final form by drawing the apexes of the triangles together to form the quarter dome substantially as shown in FIGURES 12 and 13.

The 360° hinge, as represented in FIGURE 15, is only one of several types of hinges or fasteners which may be utilized in the practice of the embodiment of the invention. Depending on the type of structure, conventional pin type hinges are utilized or, in certain cases where compact storage is not of prime importance, hinges having a rotation of substantially less than 360° may be utilized. Beneficially, in the configuration of FIGURE 14, an integral entrance to the enclosure may be provided by omitting a joint between two panels of the configuration when drawn into a quarter dome and allowing one triangular section or panel to act as a closure for the entrance.

As is apparent from the foregoing specification, the method and manufacture of the present invention are susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. A structural panel comprising a flat sheet of triangular form, said sheet having three angles A, B and C and having sides opposite said angles said sides being $a$, $b$ and $c$, respectively, said angles A, B and C being about 34½°, 58° and 87°, respectively, wherein the sum of the angles is 180° and said sides $a$, $b$ and $c$ having relative lengths of about 4, 6 and 7 units respectively, said sheet having a first generally planar major face and a second generally planar major face, and having three edge faces $a'$, $b'$ and $c'$ at corresponding sides, said edge faces being composed of two faces angularly disposed in relation to each other, said faces each having substantially similar width and forming an outwardly protruding ridge about the entire periphery of said panel, each of the edge faces terminating on one of their sides at a major face of said sheet and at the opposite side at the adjacent edge faces, the edge faces of side $a$ being disposed from a vertical erected from one of the major faces of said sheet at an angle of about 15°30′, the faces of side $b$ being disposed at an angle of about 10°10′, and the face $c$ at an angle of about 0°55′.

2. The sheet in accordance with claim 1, wherein the major portion of said body is a foam plastic.

3. A sheet in accordance with claim 2, wherein the major faces of said foam plastic body have adhered thereto a skin.

4. A generally spherical structure comprising a plurality of structural panels, said structural panels being of a generally triangular configuration and having angles A, B and C, said angles being about 34°36′, 58°7′ and 87°17′, respectively, said panels being joined together with similar edges in totally abutting arrangement and like angles adjacent to form a generally spherical surface.

5. The assembly of claim 4, wherein 60 triangles are utilized and form a hemisphere.

6. The assembly of claim 4, wherein 30 triangles are utilized to form a spherical surface.

7. A method of fabricating a hemisphere utilizing a plurality of triangular panels, said triangular panels having 3 angles A, B and C, said angles being about 34°36′, 58°7′ and 87°17′, respectively, and having three sides $a$, $b$ and $c$, said sides $a$, $b$ and $c$ having relative lengths of about 4, 6 and 7 units, respectively, said panels being arranged into five assemblies of twelve panels each, each of said assemblies comprising a first panel and a second panel, side $a$ of said first panel being pivotally joined to side $a$ of said second panel, a third panel pivotally joined on side $c$ to side $c$ of said second panel, a fourth panel being pivotally joined on its side $b$ to side $b$ of said third panel, a fifth panel joined pivotally by its side $c$ to side $c$ of said fourth panel, a sixth panel pivotally joined by its side $b$ to said fifth panel, a seventh panel pivotally joined by its side $a$ to side $a$ of said sixth panel, an eighth panel pivotally joined by its side $b$ to side $b$ of said seventh panel, a ninth panel pivotally joined by its side $c$ to side $c$ of said seventh panel, a tenth panel pivotally joined by its side $b$ to side $b$ of said ninth panel, an eleventh panel pivotally joined by its side $c$ to side $c$ of said tenth panel, a twelfth panel pivotally joined by its side $a$ to side $a$ of said eleventh panel, a second assembly connected to said first assembly by pivotally hinging side $c$ of the sixth panel of said first assembly to side $c$ of the eighth panel of said second assembly, a third assembly attached to said second assembly by pivotally connecting side $c$ of the sixth panel of the second assembly to side $c$ of the eighth panel of the third assembly, a fourth assembly connected to said third assembly by means of joining side $c$ of the sixth panel of the third assembly and side $c$ of the eighth panel of the fourth assembly, a fifth assembly joined to the fourth assembly by means of pivotally connecting side $c$ of the sixth panel of the fourth assembly to side $c$ of the eighth panel of the fifth assembly, providing a plurality of cable retaining means, each of said cable retaining means affixed to one of the panels of the assembly, passing at least one cable through said cable retaining means, applying tension to said cable and drawing said configuration into a generally hemispherical surface, all of said panels being joined with like angles being adjacent.

8. An assembly of panels comprising up to about 30 panels, each of said panels being generally of triangular form, said panels having three angles A, B and C having sides opposite said angles $a$, $b$ and $c$, respectively, said angles A, B and C being about 34½°, 58° and 87°, respectively, wherein the sum of the angles is 180° and said sides $a$, $b$ and $c$ having relative lengths of about 4, 6 and 7 units, respectively, said assembly comprising a plurality of subassemblies, said subassemblies being composed of three triangular panels, a first panel pivotally attached to said second panel by means of side $c$ of said first panel and side $c$ of said second panel, a third panel pivotally attached to said second panel, by means of side $a$ of said second panel and side $a$ of said third panel, a plurality of said subassemblies in side by side relationship being pivotally attached to each other, said subassemblies being joined to adjacent subassemblies alternately by means of side $a$ of said first panel of said subassemblies and side $b$ of the second panel of said subassemblies, all triangular panels being arranged with like angles adjacent.

9. An assembly of triangular panels, said panels comprising a generally sheet-like triangular member having angles A, B and C, said angles A, B and C being about 34°36′, 58°7′ and 87°17′, respectively, said assemblies comprising a plurality of subassemblies, each of said subassemblies comprising a first panel and a second panel, said first panel pivotally attached by means of side $c$ to side $c$ of said second panel, a third panel pivotally attached to said second panel, side $a$ of said second panel being attached to side $a$ of said third panel, a first subassembly pivotally connected to a second subassembly by means of side $a$ of the first panel of said first subassembly and side $a$ of said first panel of said second subassembly, a third subassembly pivotally connected to said second subassembly by means of side $b$ of the second panel of the second subassembly and side $b$ of the second panel of said third subassembly, a fourth subassembly affixed to said third subassembly in the manner of said first and second subassemblies, a fifth subassembly joined to said fourth subassembly in the manner of said second and third subassemblies, a sixth subassembly joined to said fifth subassembly in the manner of said first and second subassemblies, a seventh subassembly joined to the sixth subassembly in the manner of the second and third subassemblies, an eighth subassembly joined to said seventh subassembly in the manner of the first and second subassemblies, a ninth subassembly joined to said eighth subassembly in the manner of said second and third subassemblies, a tenth subassembly joined to said ninth subassembly in the manner of said first and second subassemblies, all triangular panels being arranged with like angles adjacent.

10. The assembly of claim 9, wherein said subassemblies are joined together by pivotal means capable of about 360° rotation wherein said subassemblies have a first face and a second face, all of said first faces and all of said second faces being on like sides of said assembly when said panels lie in a single plane.

11. The assembly of claim 10, wherein like adjacent subassemblies have at least one of the major faces in contiguous relationship.

12. The assembly of claim 9, wherein the apexes of said subassemblies are drawn together to form a generally spherical surface.

References Cited by the Examiner

UNITED STATES PATENTS

| | | | |
|---|---|---|---|
| 2,918,992 | 12/1959 | Gelsavage | 52—81 |
| 2,979,064 | 4/1961 | Fischer | 52—2 |
| 3,016,115 | 1/1962 | Harrison et al. | 52—18 |

FOREIGN PATENTS

| | | |
|---|---|---|
| 230,326 | 4/1959 | Australia. |
| 218,161 | 11/1961 | Austria. |
| 1,145,102 | 5/1957 | France. |

FRANK L. ABBOTT, *Primary Examiner.*

JACOB SHAPIRO, EARL J. WITMER, CHARLES E. O'CONNELL, *Examiners.*